United States Patent [19]
Whitfield

[11] Patent Number: 5,275,567
[45] Date of Patent: Jan. 4, 1994

[54] TOY BUILDING BLOCKS FOR TEACHING BRAILLE

[76] Inventor: Rudy V. Whitfield, P.O. Box 804, Benton, Ark. 72015

[21] Appl. No.: 26,838

[22] Filed: Mar. 5, 1993

[51] Int. Cl.⁵ .......................................... G09B 21/00
[52] U.S. Cl. .................................. 434/113; 434/112; 434/403; 434/172
[58] Field of Search ............... 434/112, 113, 403, 208, 434/172

[56] References Cited

U.S. PATENT DOCUMENTS

| | | | |
|---|---|---|---|
| 169,229 | 9/1875 | Chinnock | 434/403 X |
| 4,378,215 | 6/1981 | Sparks | 434/113 |
| 4,846,687 | 6/1989 | White et al. | 434/112 |
| 4,880,384 | 11/1989 | Murphy | 434/113 |
| 5,152,690 | 10/1992 | Todd | 434/112 X |

FOREIGN PATENT DOCUMENTS 3116973 11/1982 Fed. Rep. of Germany ...... 434/112

Primary Examiner—Gene Mancene
Assistant Examiner—L. Thomas
Attorney, Agent, or Firm—Stephen D. Carver; Jerry L. Mahurin

[57] ABSTRACT

Toy blocks and sets of toy blocks containing Braille characters for teaching young, sight-impaired children. A typical wooden block is cubical, comprising a pair of opposite, spaced apart display sides having recessed surfaces. One recessed surface contains a raised Braille character, and the opposite side displays the corresponding alphabetic or numerical character or characters. The recessed sides have borders comprising a bottom tactile-sensing portion that includes a plurality of raised nubs adapted to be touched for orienting the characters properly. Smaller Braille characters are preferably disposed beneath each alphabetic character.

9 Claims, 4 Drawing Sheets

TOY BUILDING BLOCKS FOR TEACHING BRAILLE

BACKGROUND OF THE INVENTION

My invention relates generally to educational play toys for children. More particularly, my invention relates to toy blocks for sight-impaired or blind children, and to toys involving Braille.

Wooden blocks have been used as toys for children throughout history. Letters and symbols have been displayed upon toy blocks for centuries. Toy blocks provide an initial exposure to the alphabet for many children. Toy block sets are known to help in achieving "reading readiness." Sight-impaired and blind children also benefit from playing with blocks. Those children with severely impaired eyesight will eventually need to learn Braille.

In a diligent search to find useful play activities for my blind and/or visually handicapped students, I developed wooden "ABC blocks" with alphabetic characters in Braille. These blocks are to be used as toys for very young blind and low-vision children who will later become Braille readers. Playing with these blocks helps familiarize children with the English and Braille alphabets. At the very least, exposure to such blocks makes children aware that alphabetic symbols do exist. Relatively few toys for the blind are made of wood, so there may be some benefit in adding variety to his or her play materials.

My "Braille blocks" are intended to do the same for the visually impaired child. They are to be used as an early exposure to Braille and part of a Braille rich environment promoting "reading readiness" in visually impaired children. Teachers will find many ways to use the blocks in teaching concepts or reinforcing learning. The blocks also present a very unintimidating introduction to Braille for the parent. Parents who play block games with their child will find this one of the easiest ways possible to learn Braille by sight.

SUMMARY OF THE INVENTION

I have developed toy wooden blocks for children that are useful in teaching Braille. Different blocks are grouped together to form a set of blocks. Each of the blocks has a pair of opposed, recessed faces that are marked with a character. One side displays an "ABC" character, i.e., a letter of the alphabet. A Braille character corresponding to the aforementioned letter is displayed on the opposite side of the block. Both characters are die-pressed into the ingrain of the block side, and the characters can be sensed readily by touch.

Both die-pressed designs contain a raised, peripheral border at the edge of the block. The top and side borders are smooth. The bottom border comprises a sensing portion having a straightline series of dot-like nubs for the purpose of orienting the blind user to the bottom of the characters. Once the bottom border is referenced, the Braille character will be properly referenced for reading. Preferably the raised portions of all the designs are painted in a dark color, while the background is a much lighter complimenting color.

A set of these blocks normally contains twenty-six pieces, one block for each letter of the alphabet. Four or five different color combinations are used for variety. In an advanced set, one side of the blocks may contain a word, punctuation mark, or number, and the opposite side displays the appropriate Braille symbol. In an alternative set employed for spelling whole words, blocks with more-frequently appearing letters such as "E" or "T" outnumber blocks displaying less frequently used letters such as "Z" or "X."

Thus a basic object of my invention us to provide toy blocks for very young blind and low-vision children who will later become Braille readers.

Another object is to provide toy blocks which can familiarize children with the English and Braille alphabets, or at the very least, make them aware that such alphabetic symbols do exist.

Another object is to provide an enjoyable Braille teaching toy for visually impaired children.

Another object is be provide an early exposure to Braille and a Braille-rich environment that promotes "reading readiness" in visually impaired children.

Another object is to provide toy blocks that enable Braille teachers to convey Braille concepts and reinforce learning.

A still further object is to provide a very unintimidating introduction to Braille for the parent of sight-impaired children. It is a feature of the invention that parents who play block games with their children will learn Braille by sight.

Another fundamental object is to provide a "fun toy" for the visually impaired child that lasts over a time span of many years.

Yet another object is to provide a toy for children that helps develop counting skills.

Another important object is to develop tactile discrimination skills in young children.

A basic object is to advance children's understanding of Braille, and the recognition of Braille characters in general.

These and other objects and advantages of the present invention, along with features of novelty appurtenant thereto, will appear or become apparent in the course of the following descriptive sections

BRIEF DESCRIPTION OF THE DRAWINGS

In the following drawings, which form a part of the specification and which are to be construed in conjunction therewith, and in which like reference numerals have been employed throughout wherever possible to indicate like parts in the various views.

DETAILED DESCRIPTION

Figure 1:
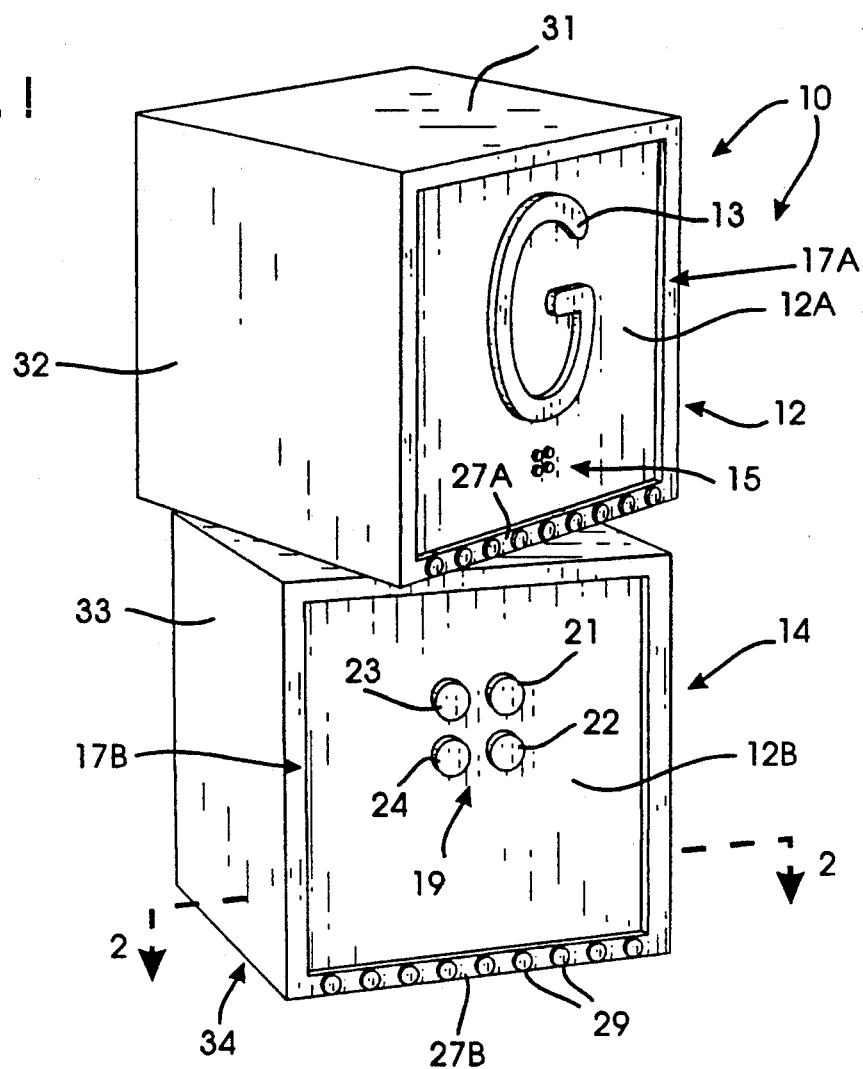
FIG. 1 is an isometric view showing a pair of blocks constructed in accordance with the best mode teachings of the invention.
Figure 2:
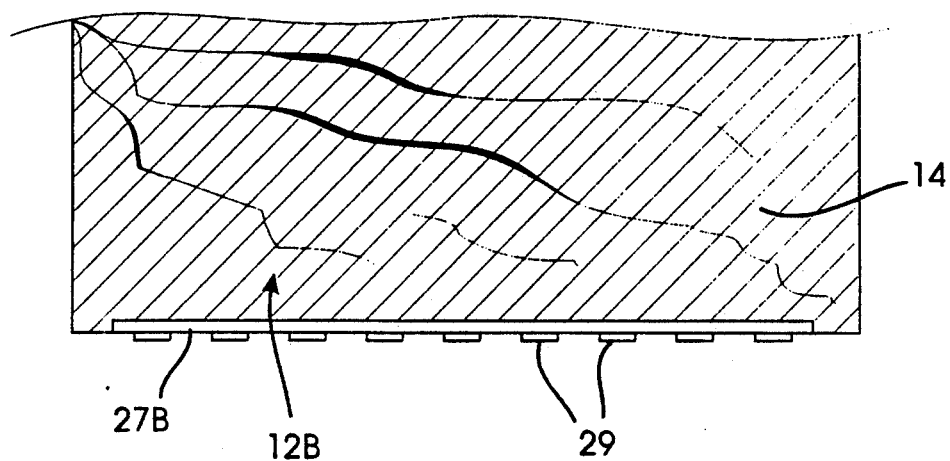
FIG. 2 is a sectional view taken generally along line 2—2 of FIG. 1.
Figure 3:
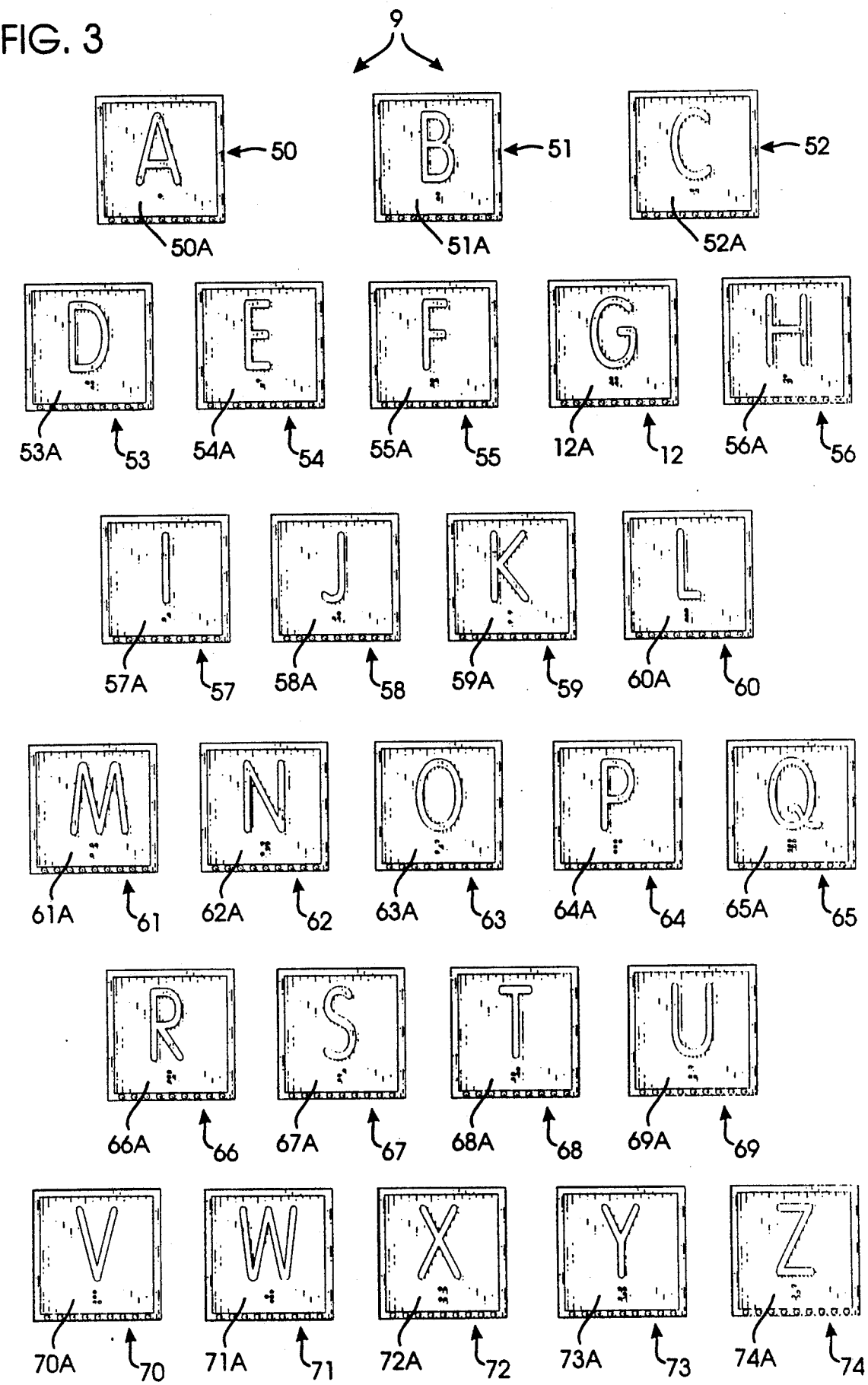
FIG. 3 is plan view of a preferred set of blocks.

With initial reference now directed to FIGS. 1 through 3 of the drawings, my preferred Braille block set has been generally designated by the reference numeral 9. Set 9 includes a plurality of blocks marked on one side with Braille characters and on their other sides with alphabetic or numerical characters. In FIG. 1 a pair of stacked Braille blocks exhibiting the letter "G" have been generally designated by the reference numeral 10. A "G-Block" 12 is stacked upon a companion "G-Block" 14 for illustration purposes.

A typical block 12, 14 preferably comprises a generally cubical body having six square sides. Other multifaceted geometric shapes could be employed. A recessed side surface 12A is opposed from a recessed back surface 12B. Surface 12A includes an outwardly projecting raised character 13 corresponding to the alphabetical letter "G." Immediately below the character 13 are small, raised Braille characters 15 that correspond to the letter "G." The "G" character 13 and the Braille character 15 rise upwardly from the surface 12A. Surface 12A is surrounded by a border generally designated by the reference numeral 17A.

The opposite surface 12B comprises raised Braille character 19 comprised of four individually projecting nubs 21 through 24 arranged in the corresponding Braille pattern. Boarder 17B is raised above recessed surface 12B. It is substantially the same as border 17A.

Both borders comprise a bottom tactile-sensing portion 27A or 27B that includes a plurality of spaced apart, raised nubs 29. The nubs provide a means for tactile sensing for orienting the characters properly. In other words, the bottom portion 27A or 27B of the various borders 17A or 17B can be sensed by touch. When the user touches nubs 29 he or she can readily determine the proper orientation for the characters being thereafter touched or sensed. Thus Braille character 19 or 15 or alphabetical character 13 will be oriented properly, providing that the tactile sensing nubs 29 are disposed at the bottom of the block as shown FIGS. 1 and 2.

The faces 12A and 12B are opposed from one another. In the best mode the blocks are made of wood and four non-recessed surfaces including the top 31, bottom 34 and sides 32, 33 are serially contiguous and smooth. By grasping the blocks the blind user can readily discover through touch the location of the serially contiguous surfaces 31-34, and hence thereafter readily discern the location of the recessed surfaces 12A or 12B to orient the block. The later phenomenon is of particular importance when sight-impaired children play with the blocks.

Figure 4:
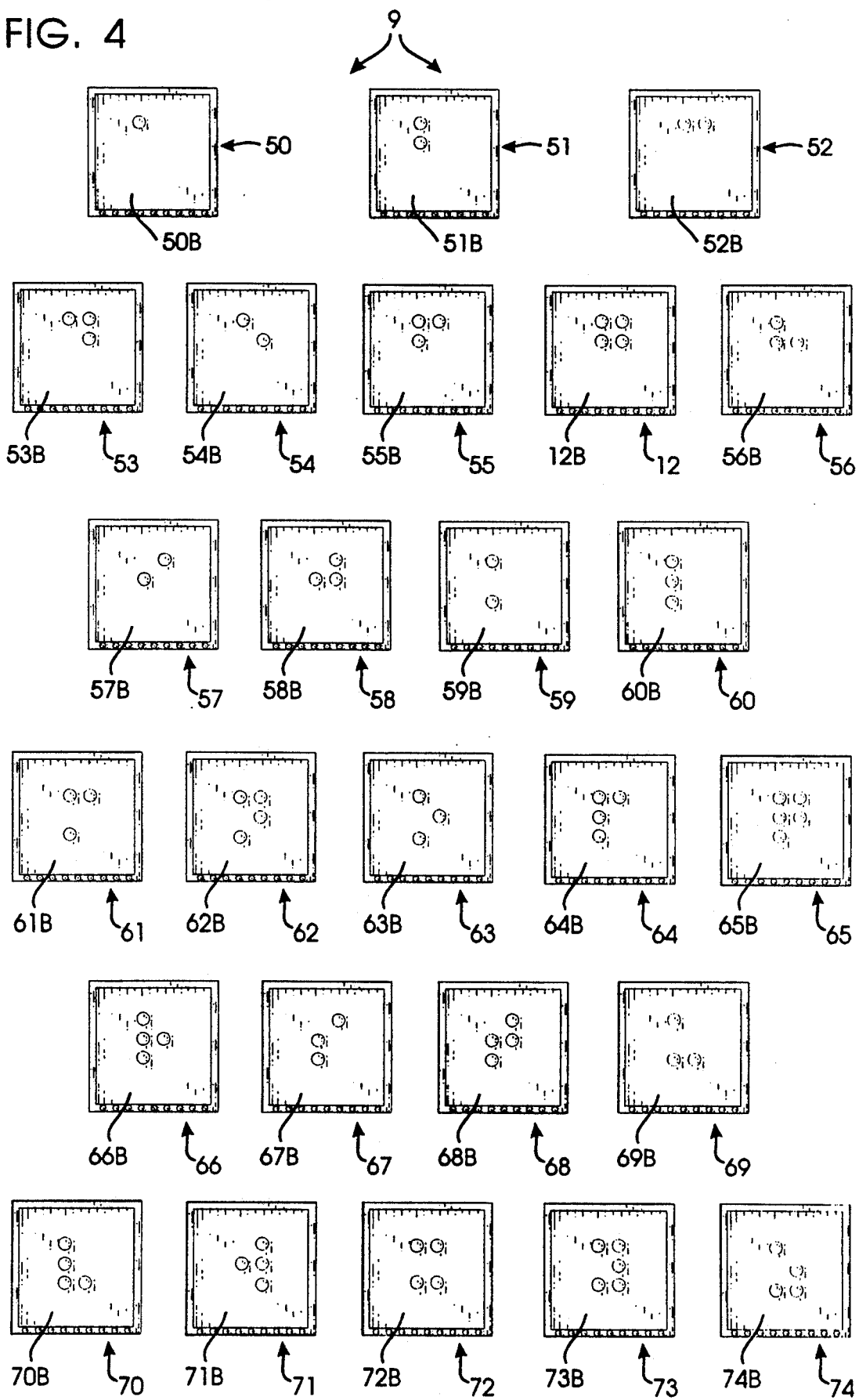
FIG. 4 is a plan view of the block set of FIG. 3, showing the opposite side; and, FIG. 5 is an elevational view of optional blocks showing blocks with additional characters that some students may require.

With reference now to FIGS. 3 and 4, the entire set 9 of blocks is illustrated. In FIGS. 3 and 4 the "G-Block" 12 is illustrated and faces 12A and 12B are exposed in FIGS. 3 and 4 respectively. The Braille symbols and the corresponding alphabetical characters can be determined for other letters by comparing the drawing figures. Blocks 50 through 55 generally illustrate the characters A through F. Blocks 56 through 74 illustrate the corresponding alphabetic characters H-Z. Each of the blocks 50-74 includes a front surface 50A-74A marked with the appropriate alphabetical character. As seen in FIG. 4, each of the blocks 50-74 include appropriate recessed opposite surfaces 50B through 74B upon which suitable Braille characters corresponding to the alphabetical characters are shown.

Figure 5:
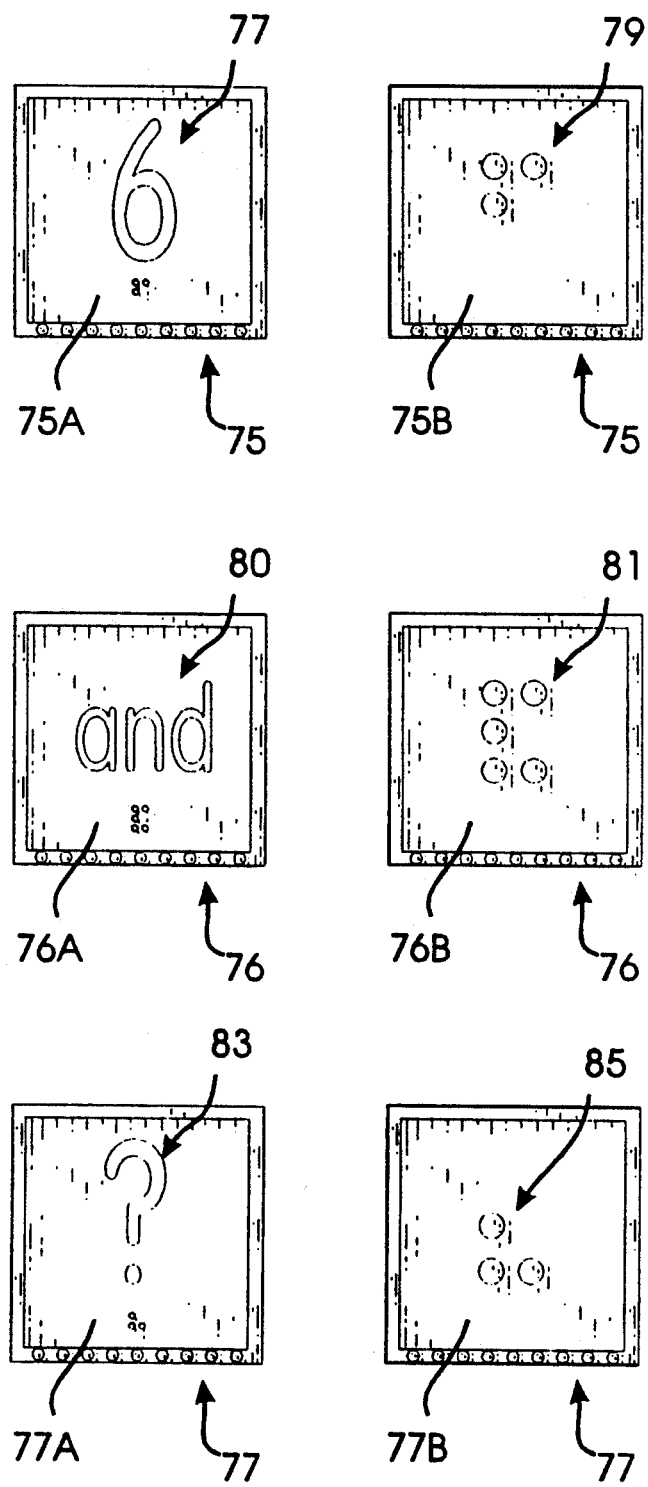

I prefer that young sight-impaired children first play with a set 9 of blocks as seen in FIGS. 3 and 4. Set 9, for illustration purposes, includes one each of the letters A-Z. When the blocks are used by older children who begin to spell words, a set of blocks preferably will contain a greater number of common letters, and a lesser number of rarer letters. In other words, older children and adults may best be served when their block sets contain more blocks marked with E, T or I than blocks marked with Z or Q. As the children learn more about Braille, numbers and the alphabet, extra sets of blocks may be employed as in FIG. 5.

Block 75, for example, includes a front surface 75A marked with a character 77 corresponding to the number "6". The opposite recessed surface 75B of Block 75 includes the corresponding Braille character 79. Block 76 includes a recessed front surface 76A having alphabetic characters spelling the word "and." This array 80 of alphabetic characters may be sensed by the user and compared with the Braille symbol 81 of the word "and" disposed on recessed surface 76B of Block 76. Finally, punctuation marks such as character 83 (i.e., a question mark) on recessed surface 77A of Block 77 may be discerned by touching the corresponding Braille character 85 which projects outwardly from recess surface 77B on Block 77.

In the best mode known to me, each block is made of wood. The preferred dimensions are 2¼"×2¼"×2¼." I determined that this size was superior to possible smaller sizes because this size is easier to stack, and the stack it is less likely to be accidentally knocked over when a child reaches to find it. I have personally observed that children three to four years of age prefer this to smaller sized blocks. Die-pressing is preferably used to form the characters in the opposite recessed sides. The sensing borders are preferably 3/16" wide. The top and side borders are smooth.

Preferably the raised portions of all the designs are painted in a dark color, while the background is a much lighter complimenting color. Four of five different color combinations are used for variety. In the best mode, the sides of each block are painted one solid color—red, yellow, blue, orange, green or violet. The purpose of this is to make it easy for low-vision children to closely compare color differences.

Smaller Braille characters 15 are preferably disposed beneath each alphabetic character. The opposite side, as discussed above, exhibits the much larger corresponding Braille character. The purpose of this is to give the child very early exposure to Braille symbols, possibly as early as nine or ten months of age. As the child plays with the blocks over a period of time, he or she eventually understands that dots exist, that patterns of dots can symbolize letters, and that letters can be put together to make words. When the child later studies the Braille cell and the Braille alphabet, the blocks will offer good reinforcement. The purpose of the standard-size Braille under the large English letter is so that a low-vision child might see the English while simultaneously reading the Braille by touch. The design on the opposite side of the block is a large block-style English alphabet character with standard-sized Braille characters just below it. The English character is large enough so that a child can trace its shape with his/her finger.

During play a simple game would be for the child to stack the blocks in groups of two or three. A child with some vision might stack all blocks of one color together.

Alternatively, the child may be given three, four or five blocks and asked to count them aloud as he or she stacks them. At this time teachers should listen for counting skill developments, or count for the child who is not yet counting. The child's interest and concentration can be stimulated when the teacher asks to show the block on top, or show the block on the bottom.

In another game variation, a child may pick up one block at a time and tell the teacher (or other helper) which letter of the alphabet that block represents. A child with total vision loss would use touch only, whereas a low vision child would employ a combination of touch and sight. Numerous other game variations or teaching methods may be envisioned.

From the foregoing, it will be seen that this invention is one well adapted to obtain all the ends and objects herein set forth, together with other advantages which are inherent to the structure.

It will be understood that certain features and subcombinations are of utility and may be employed without reference to other features and subcombinations. This is contemplated by and is within the scope of the claims.

As many possible embodiments may be made of the invention without departing from the scope thereof, it is to be understood that all matter herein set forth or shown in the accompanying drawings is to be interpreted as illustrative and not in a limiting sense.

What is claimed is:

1. A toy block for teaching Braille, said block comprising:
    a generally cubical body having a plurality of faces;
    a first of said faces comprising a Braille character; and,
    a second of said faces comprising an alphabetic or numeric character of characters equivalent to said Braille character;
    wherein said first and second faces comprise a recessed surface from which said characters upwardly project for tactile perception; and
    wherein each recessed surface comprises a raised peripheral boarder.

2. The toy block of claim 1 further comprising a bottom capable of tactile sensing that enables the user of said block to properly orient said characters for tactile reading.

3. A toy block for teaching Braille to children, said block comprising:
    a generally cubical body having six faces;
    a first one of said faces comprising a recessed surface displaying a Braille character; and,
    a second one of said faces comprising a recessed surface displaying the alphabetic or numeric character of characters equivalent to said Braille character;
    wherein said characters are raised from said recessed surface for tactile sensing; and
    wherein each recessed surface comprises a raised peripheral boarder.

4. The toy block of claim 3 further comprising tactile stimulating means for enabling the user of said block to properly orient said characters for tactile sensing.

5. The toy block of claim 3 wherein said raised peripheral border comprises tactile stimulating means for enabling the user of said block to properly orient said characters for tactile sensing.

6. The toy block of claim 5 wherein four of the faces of said block not marked with characters are serially contiguous and form a tactile-discoverable boundary between said first and second faces.

7. A toy block set for teaching Braille to children, said block set comprising a plurality of individual blocks comprising:
    a generally cubicle body having a plurality of faces;
    a first face comprising a recessed surface displaying a raised Braille character;
    a second face comprising a recessed surface displaying alphabetic or numeric character or characters corresponding to said Braille character, said second face disposed on said body opposite from said first face, and said second face displaying a raised Braille character physically smaller than said last mentioned Braille character but corresponding to it.

8. The toy block set of claim 7 wherein each of said recessed surfaces comprise a raised peripheral border and said raised peripheral border comprises a tactile stimulating portion for enabling the user of said block to properly orient said characters for tactile sensing.

9. The toy block set of claim 8 wherein a plurality of said faces of each block in said block set are not marked with characters, and they are serially contiguous and form a tactile discoverable boundary between the faces marked with characters.

* * * * *